US012586242B2

(12) United States Patent
Hayashi et al.

(10) Patent No.: US 12,586,242 B2
(45) Date of Patent: Mar. 24, 2026

(54) METHOD, SYSTEM, AND COMPUTER PROGRAM FOR RECOGNIZING POSITION AND ATTITUDE OF OBJECT IMAGED BY CAMERA

(71) Applicant: SEIKO EPSON CORPORATION, Tokyo (JP)

(72) Inventors: Masaki Hayashi, Matsumoto (JP); Jian Yao, Markham (CA); Dibyendu Mukherjee, Hamilton (CA); Andrei Mark Rotenstein, Thornhill (CA)

(73) Assignee: SEIKO EPSON CORPORATION (JP)

( * ) Notice: Subject to any disclaimer, the term of this patent is extended or adjusted under 35 U.S.C. 154(b) by 465 days.

(21) Appl. No.: 18/171,786

(22) Filed: Feb. 21, 2023

(65) Prior Publication Data

US 2023/0267646 A1 Aug. 24, 2023

(30) Foreign Application Priority Data

Feb. 22, 2022 (JP) ................................ 2022-025237

(51) Int. Cl.
| | |
|---|---|
| *G06T 7/73* | (2017.01) |
| *B25J 9/16* | (2006.01) |
| *B25J 19/02* | (2006.01) |
| *G06T 7/50* | (2017.01) |

(52) U.S. Cl.
CPC .............. *G06T 7/75* (2017.01); *B25J 9/1671* (2013.01); *B25J 9/1697* (2013.01); *B25J 19/023* (2013.01); *G06T 7/50* (2017.01)

(58) Field of Classification Search
CPC ... G06T 7/75; G06T 7/50; G06T 2207/20056; G06T 2207/30164; G06T 7/74; B25J 9/1671; B25J 9/1697; B25J 19/023; G05B 2219/40564
USPC ........ 382/103, 154, 151, 209, 294; 345/420; 348/94
See application file for complete search history.

(56) References Cited

U.S. PATENT DOCUMENTS

| | | | | |
|---|---|---|---|---|
| 7,084,900 | B1 * | 8/2006 | Watanabe ................. | G06T 7/75 |
| | | | | 348/94 |
| 8,233,742 | B2 * | 7/2012 | Masuda .................... | G06T 7/35 |
| | | | | 382/280 |
| 8,306,314 | B2 * | 11/2012 | Tuzel ........................ | G06T 7/74 |
| | | | | 382/209 |
| 10,885,386 | B1 * | 1/2021 | Evans ..................... | G06N 20/00 |
| 2009/0129665 | A1 * | 5/2009 | Ishiyama ................ | G06T 17/10 |
| | | | | 382/154 |

(Continued)

FOREIGN PATENT DOCUMENTS

JP 2015-194478 A 11/2015

*Primary Examiner* — Kathleen Y Dulaney
(74) *Attorney, Agent, or Firm* — Harness, Dickey & Pierce, P.L.C.

(57) ABSTRACT

A method of the present disclosure includes (a) extracting distinctive features used for respectively distinguishing a plurality of similar attitudes from which images similar to one another are obtained using a simulation model of an object, (b) capturing an object image of the object using a camera, (c) estimating a position and an attitude of the object using the object image, and (d) when the estimated attitude corresponds to one of the plurality of similar attitudes, determining the one of the plurality of similar attitudes as the attitude of the object using the distinctive features.

9 Claims, 10 Drawing Sheets

(56) References Cited

U.S. PATENT DOCUMENTS

| | | | | |
|---|---|---|---|---|
| 2013/0271577 A1* | 10/2013 | Watanabe | ................. | G06T 7/75 |
| | | | | 348/46 |
| 2017/0106540 A1* | 4/2017 | Watanabe | ............ | G06V 20/653 |
| 2018/0350056 A1* | 12/2018 | Cardenas Bernal | . | G01N 21/954 |
| 2019/0272411 A1* | 9/2019 | Zou | ........................... | G06T 7/10 |
| 2021/0016448 A1* | 1/2021 | Iida | .................... | G01B 11/2518 |
| 2022/0092290 A1* | 3/2022 | Yoshida | .................... | G06T 7/75 |
| 2022/0277573 A1* | 9/2022 | Makino | .................... | G06T 7/60 |
| 2022/0408069 A1* | 12/2022 | Ota | ...................... | H04N 13/167 |
| 2023/0041378 A1* | 2/2023 | Abouelela | ............ | G06V 10/757 |
| 2023/0206566 A1* | 6/2023 | Kim | ........................ | G06T 19/20 |
| | | | | 345/633 |
| 2023/0278198 A1* | 9/2023 | Wang | ...................... | B25J 9/163 |
| | | | | 700/259 |

* cited by examiner

FIG. 4

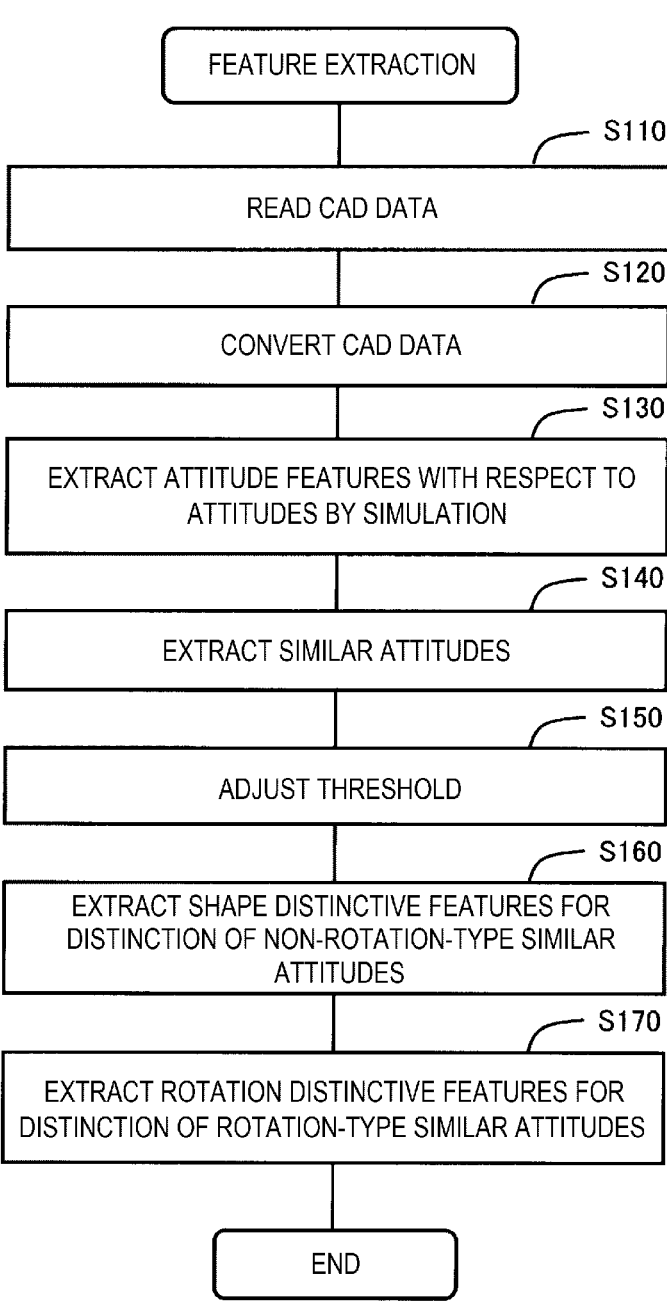

FEATURE EXTRACTION

S110

READ CAD DATA

S120

CONVERT CAD DATA

S130

EXTRACT ATTITUDE FEATURES WITH RESPECT TO ATTITUDES BY SIMULATION

S140

EXTRACT SIMILAR ATTITUDES

S150

ADJUST THRESHOLD

S160

EXTRACT SHAPE DISTINCTIVE FEATURES FOR DISTINCTION OF NON-ROTATION-TYPE SIMILAR ATTITUDES

S170

EXTRACT ROTATION DISTINCTIVE FEATURES FOR DISTINCTION OF ROTATION-TYPE SIMILAR ATTITUDES

END

*FIG. 5*
OB1_1                 OB1_2
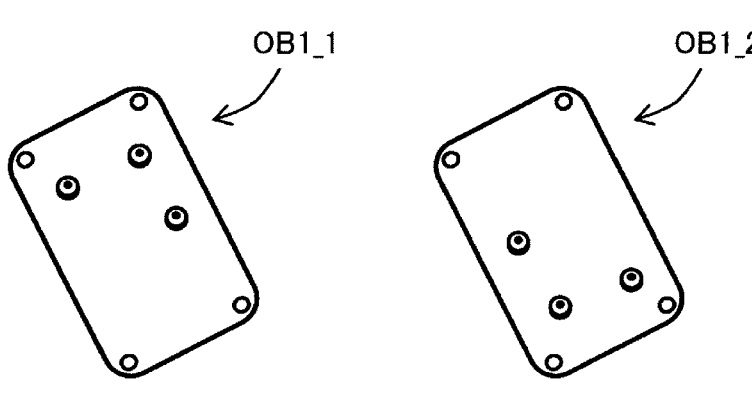
OB1_3                 OB1_4
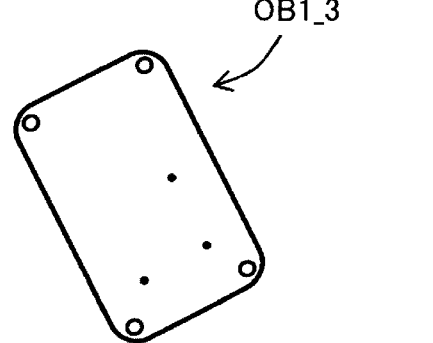
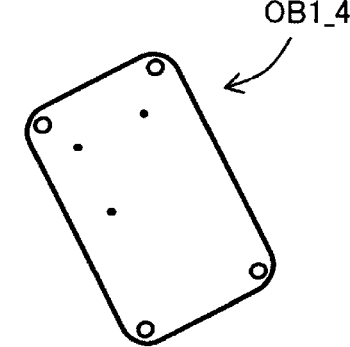
*FIG. 6*
CX
OB2_1                 OB2_2
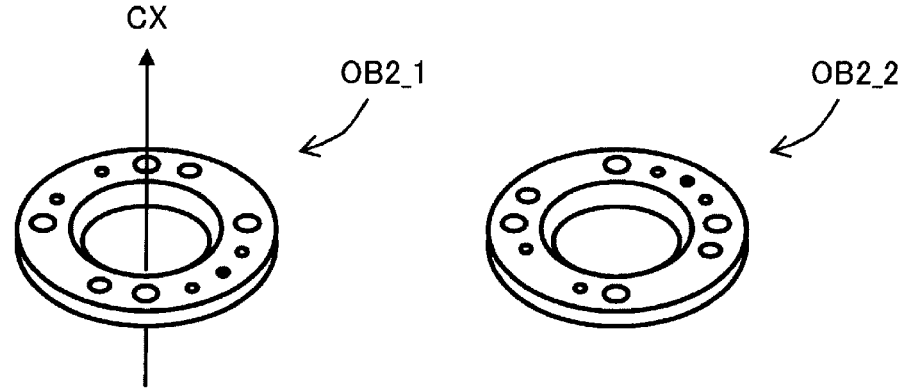
OB2_3                 OB2_4
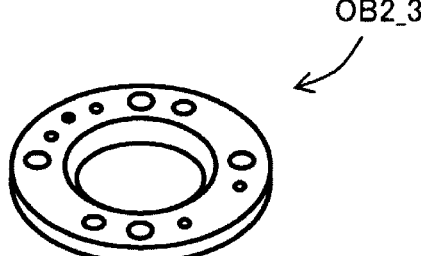
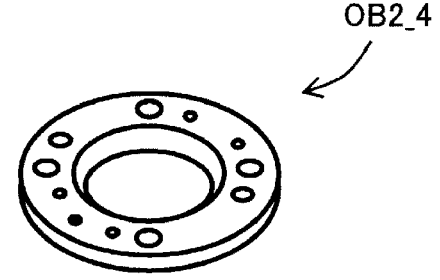

OB3

MP(i)    $n_f(i)$    OB3

VP

SP

OB2

| THRESHOLD SETTING OF SIMILAR ATTITUDES | | | | |
|---|---|---|---|---|
| ATTITUDE | OB1_1 | OB1_2 | OB1_3 | OB1_4 |
| THRESHOLD Th<br>0.75<br>SF | | | | |
| SIMILARITY | 1.0 | 0.90 | 0.80 | 0.70 |

METHOD, SYSTEM, AND COMPUTER PROGRAM FOR RECOGNIZING POSITION AND ATTITUDE OF OBJECT IMAGED BY CAMERA

The present application is based on, and claims priority from JP Application Serial Number 2022-025237, filed Feb. 22, 2022, the disclosure of which is hereby incorporated by reference herein in its entirety.

BACKGROUND

1. Technical Field

The present disclosure relates to a method, a system, and a computer program for recognizing a position and an attitude of an object imaged by a camera.

2. Related Art

JP-A-2015-194478 discloses a technique of measuring a position and an attitude of a target object. In the related art, similar attitudes including the front and the back of a component are determined based on specific portions for distinction of the attitudes. For the determination, it is necessary for a user to perform work to designate the portions by which the similar attitudes may be distinguished via a user interface.

However, in the related art, for recognition of the position and the attitude of the object, time and effort are required for manual settings using the user interface and wrong settings may be made by human error.

SUMMARY

According to a first aspect of the present disclosure, a method of recognizing a position and an attitude of an object imaged by a camera is provided. The method includes (a) extracting distinctive features used for respectively distinguishing a plurality of similar attitudes from which images similar to one another are obtained using a simulation model of the object, (b) capturing an object image of the object using the camera, (c) estimating the position and the attitude of the object using the object image, and (d) when the estimated attitude corresponds to one of the plurality of similar attitudes, determining the one of the plurality of similar attitudes as the attitude of the object using the distinctive features.

According to a second aspect of the present disclosure, a system of recognizing a position and an attitude of an object imaged by a camera is provided. The system includes a feature extraction unit extracting distinctive features used for respectively distinguishing a plurality of similar attitudes from which images similar to one another are obtained using a simulation model of the object, and a recognition unit recognizing the position and the attitude of the object using an object image of the object captured by the camera. The recognition unit executes (a) processing of estimating the position and the attitude of the object using the object image, and (b) when the estimated attitude corresponds to one of the plurality of similar attitudes, processing of determining the one of the plurality of similar attitudes as the attitude of the object using the distinctive features.

According to a third aspect of the present disclosure, a computer program for controlling a processor to execute processing of recognizing a position and an attitude of an object imaged by a camera is provided. The computer program is for controlling the processor to execute (a) processing of extracting distinctive features used for respectively distinguishing a plurality of similar attitudes from which images similar to one another are obtained using a simulation model of the object, (b) processing of capturing an object image of the object using the camera, (c) processing of estimating the position and the attitude of the object using the object image, and (d) when the estimated attitude corresponds to one of the plurality of similar attitudes, processing of determining the one of the plurality of similar attitudes as the attitude of the object using the distinctive features.

BRIEF DESCRIPTION OF THE DRAWINGS

FIG. 4 is a flowchart showing a procedure of feature extraction processing.

FIG. 5 is an explanatory diagram showing a first object and attitudes thereof.

FIG. 6 is an explanatory diagram showing a second object and attitudes thereof.

DESCRIPTION OF EXEMPLARY EMBODIMENTS

Figure 1:
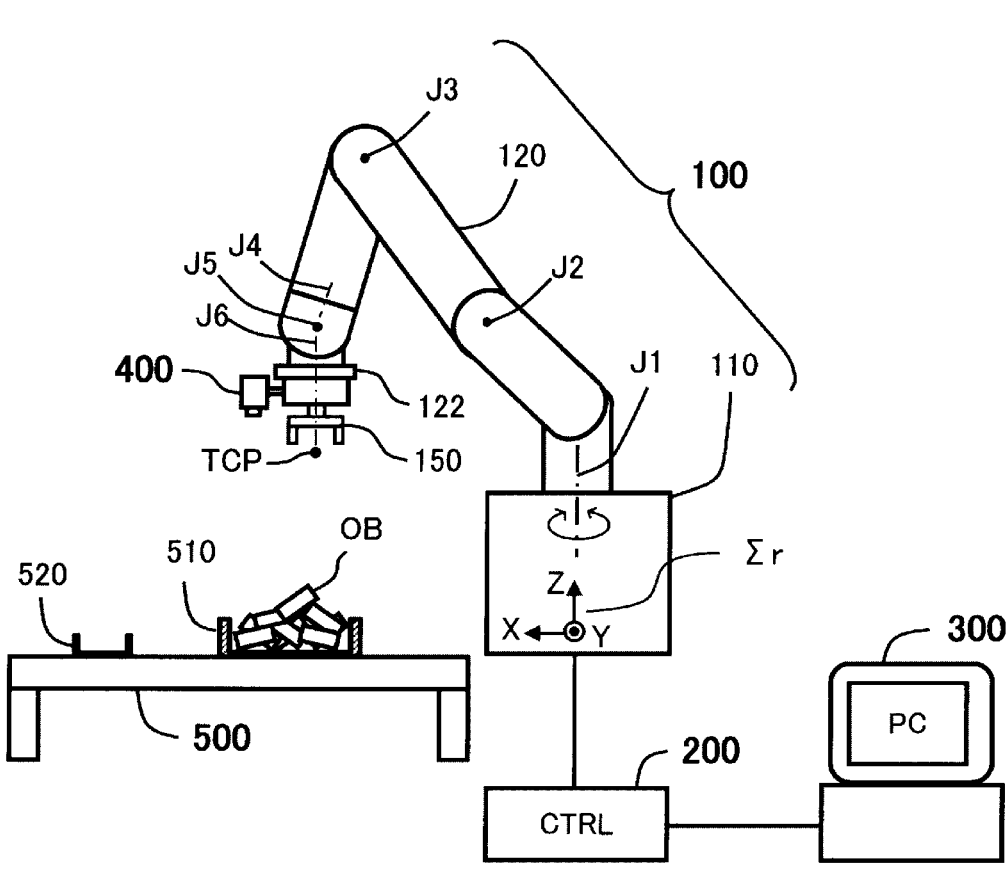
FIG. 1 is an explanatory diagram showing a configuration of a robot system in an embodiment.

FIG. 1 is an explanatory diagram showing an example of a robot system in one embodiment. The robot system includes a robot 100, a control apparatus 200 controlling the robot 100, an information processing apparatus 300, a camera 400, and a platform 500. The information processing apparatus 300 is e.g., a personal computer. In FIG. 1, three axes X, Y, Z defining an orthogonal coordinate system in a three-dimensional space are drawn. The X-axis and the Y-axis are horizontal axes and the Z-axis is a vertical axis. These X-, Y-, Z-axes are coordinate axes of a robot coordinate system $\Sigma r$ with the origin in a predetermined position of the robot 100.

The robot 100 includes a base 110 and a robot arm 120. A hand 150 as an end effector is attached to an arm end 122 as the distal end portion of the robot arm 120. The hand 150 can be realized as a gripper or a suction pad that can grip an object OB. A TCP (Tool Center Point) as a control point of the robot 100 is set in the distal end portion of the hand 150. Note that the control point TCP can be set in an arbitrary position.

The robot arm 120 is sequentially coupled by six joints J1 to J6. Of these joints J1 to J6, the three joints J2, J3, J5 are bending joints and the other three joints J1, J4, J6 are twisting joints. In the embodiment, the six-axis robot is exemplified, however, a robot having any robot arm mechanism having one or more joints can be used. Further, the robot 100 of the embodiment is a vertical articulated robot, however, a horizontal articulated robot may be used.

A first tray 510 and a second tray 520 are placed on the platform 500. A plurality of objects OB are loaded in bulk on the first tray 510. The second tray 520 is used as a location where the objects OB taken out from the first tray 510 are mounted. The robot 100 executes work to take out the objects OB from the first tray 510 and mount the objects on the second tray 520.

The camera 400 capturing an image of the objects OB within the first tray 510 is placed in the distal end portion of the robot arm 120. The image captured by the camera 400 is used for obtainment of the three-dimensional positions and attitudes of the objects OB. Hereinafter, the three-dimensional position and attitude are referred to as "position and attitude". As the camera 400, e.g., an RGBD camera or a stereo camera may be used. The RGBD camera is a camera having an RGB camera capturing an RGB image and a D camera capturing a depth image. In place of the RGB image, a monochrome camera capturing a gray image may be used. Or, as the camera 400, a monocular camera can be used. Note that the camera 400 is not necessarily placed in the robot arm 120, but may be separately placed from the robot 100. There is an advantage that the imaging direction of the object OB by the camera 400 is easily changed when the camera 400 is placed in the robot arm 120.

Figure 2:
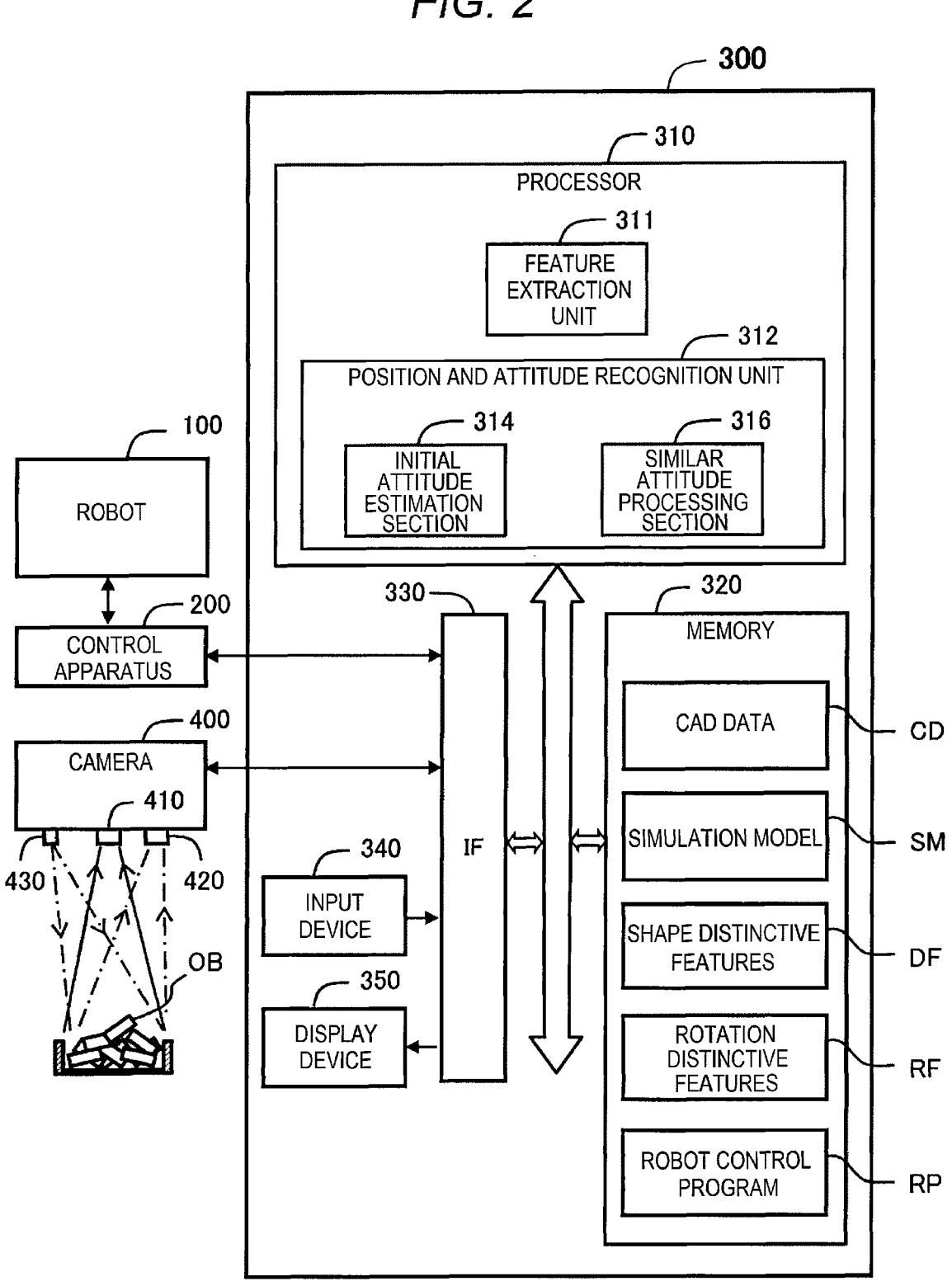
FIG. 2 is a functional block diagram of an information processing apparatus in the embodiment.

FIG. 2 is a block diagram showing functions of the information processing apparatus 300. The information processing apparatus 300 has a processor 310, a memory 320, an interface circuit 330, and an input device 340 and a display device 350 coupled to the interface circuit 330. Further, the control apparatus 200 and the camera 400 are coupled to the interface circuit 330.

In the embodiment, the camera 400 has a first camera 410 capturing a two-dimensional image including an RGB image and a gray image, a second camera 420 capturing a depth image, and an illumination unit 430 radiating illumination light for the second camera 420. The illumination unit 430 is a projector radiating an infrared pattern for capture of the depth image.

The processor 310 has functions as a feature extraction unit 311 and a position and attitude recognition unit 312. The feature extraction unit 311 extracts distinctive features used for respective distinction of a plurality of similar attitudes for which similar images to one another are obtained using a simulation model of the object OB. The position and attitude recognition unit 312 recognizes the position and the attitude of the object OB using the object image of the object OB captured by the camera 400. The position and attitude recognition unit 312 is also simply referred to as "recognition unit". The position and attitude recognition unit 312 includes functions of an initial attitude estimation section 314 and a similar attitude processing section 316. The initial attitude estimation section 314 executes processing of recognizing an initial attitude of the object OB from the object image of the object OB captured by the camera 400. "Initial attitude" refers to an attitude recognized before the similar attitude processing is performed. When the initial attitude corresponds to one of the plurality of similar attitudes, the similar attitude processing section 316 executes processing of determining the one of the plurality of similar attitudes as the attitude of the object OB using the distinctive features extracted by the feature extraction unit 311. The functions of the feature extraction unit 311 and the position and attitude recognition unit 312 are respectively realized by the processor 310 executing a computer program stored in the memory 320. Note that part or all of the functions of the feature extraction unit 311 and the position and attitude recognition unit 312 may be realized using a hardware circuit.

In the memory 320, CAD data representing the outer shape of the object OB, a simulation model SM of the object OB, shape distinctive features DF and rotation distinctive features RF on the similar attitudes, and a robot control program RP are stored. The robot control program RP includes a plurality of commands for moving the robot 100.

Figure 3:
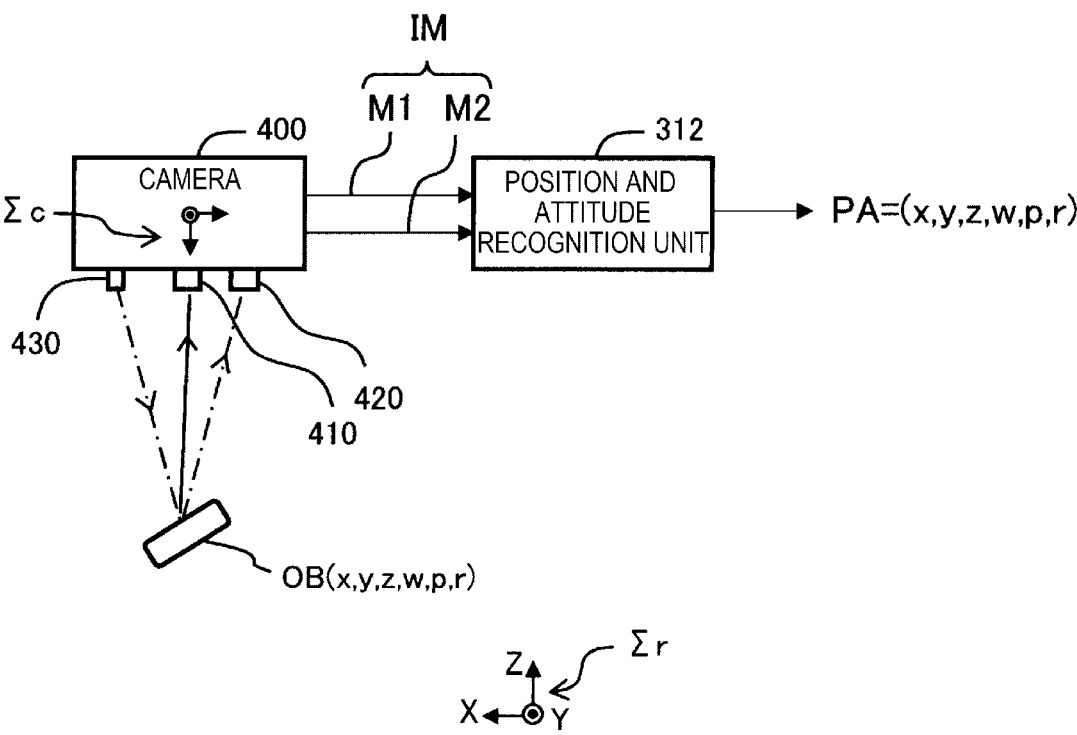
FIG. 3 is an explanatory diagram showing a recognition function of position and attitude of an object by a position and attitude recognition unit.

FIG. 3 is an explanatory diagram showing a recognition function of the position and attitude of the object OB by the position and attitude recognition unit 312. The camera 400 is calibrated in advance and the relative relationship between a camera coordinate system $\Sigma c$ and the robot coordinate system $\Sigma r$ is known. The camera 400 creates a two-dimensional image M1 and a depth image M2 by imaging the object OB. The depth image M2 is created using the phase shift method, the spatial coding method, the stereo block matching method, or the like. Hereinafter, these images M1, M2 are also collectively referred to as "object image IM". The position and attitude recognition unit 312 determines position and attitude PA of the object OB according to input of the object image IM. For example, the position and attitude PA are expressed by a position (x,y,z) and an attitude (w,p,r) in the robot coordinate system $\Sigma r$. The attitude is expressed by rotation angles (w,p,r) around three axes.

Regarding a target object for which position and attitude PA are recognized of the plurality of objects loaded in bulk, there are the following three options:

(A1) only the uppermost object;

(A2) not only the uppermost object but also the object partially overlapping with the other object, specifically, e.g., the object with a hidden area ratio at 20% or less; and (A3) all of the objects.

In consideration of the actual bulk picking work, it is preferable to recognize the position and attitude of the (A2) objects. As below, for convenience of explanation, it is assumed that, according to the (A1), the position and attitude recognition unit 312 recognizes the position and attitude PA of only one object. In the following explanation, it is assumed that position and attitude PA of one of two objects OB1, OB2 shown in FIGS. 5 and 6 are recognized.

FIG. 5 is an explanatory diagram showing the first object OB1 and attitudes thereof, and FIG. 6 is an explanatory diagram showing the second object OB2 and attitudes thereof. In FIG. 5, a plurality of attitudes of the same object OB1 are distinguished by additional signs "_1" to "_4" attached to the end of the sign OB1. The same applies to FIG. 6. The plurality of attitudes OB1_1 to OB1_4 shown in FIG. 5 are attitudes different in rotation angle or front and back orientations from one another. The plurality of attitudes OB2_1 to OB2_4 shown in FIG. 6 are attitudes at different rotation angles when the object OB2 is rotated around one rotation axis CX.

Some of the plurality of attitudes of the same object are similar to one another, and the initial attitude recognized by the initial attitude estimation section 314 from the image of the object captured by the camera 400 is not a correct attitude and may be falsely recognized as another attitude. Accordingly, the similar attitude processing section 316 determines which of the plurality of similar attitudes is a correct attitude of the object.

As in the example in FIG. 6, when a plurality of attitudes obtained when an object is rotated around one rotation axis CX are similar attitudes, those similar attitudes are referred to as "rotation-type similar attitudes". On the other hand, as in the example in FIG. 5, when a plurality of similar attitudes include an attitude not obtained only by rotation of an object around one rotation axis, those similar attitudes are referred to as "non-rotation-type similar attitudes". As will be described later, the shape distinctive features DF are extracted with respect to the non-rotation-type similar attitudes and the rotation distinctive features RF are extracted with respect to the rotation-type similar attitudes.

FIG. 4 is a flowchart showing a procedure of feature extraction processing executed by the feature extraction unit 311. The feature extraction processing is executed as a preparation process before actual work using the robot 100 is performed. The feature extraction unit 311 reads the CAD data of the object OB at step S110 and executes conversion of the CAD data at step S120.

Figures 7, 8:
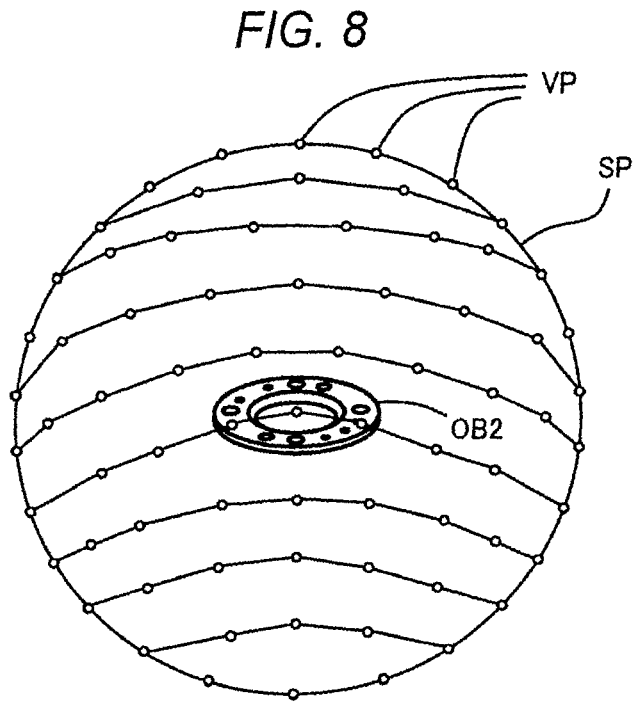
FIG. 7 is an explanatory diagram showing details of conversion processing of CAD data at step S120.
FIG. 8 is an explanatory diagram showing part of a plurality of viewpoints used at step S130.

FIG. 7 is an explanatory diagram showing details of conversion processing of the CAD data at step S120. Here, for convenience of explanation, states before and after conversion processing of an object OB3 having a simple rectangular parallelepiped shape are shown. The conversion processing is processing of sufficiently fine isotropic mesh division of the surface of the object OB3 represented by the CAD data. Specifically, the individual surfaces of the object OB3 are divided into triangular microfacets MP (i). The parameter i is an ordinal number of the microfacet MP forming one object OB3. As will be described later, the shape distinctive feature DF of the object OB is created using a unit normal vector $n_f(i)$ of the microfacet MP (i) showing the shape of the object.

At step S130 in FIG. 4, the feature extraction unit 311 respectively extracts the attitude features with respect to the plurality of attitudes of the object using the simulation model of the object.

FIG. 8 is an explanatory diagram showing part of a plurality of viewpoints VP used for obtainment of the plurality of attitudes at step S130. Here, a virtual sphere SP is set with the object OB2 at the center and the plurality of viewpoints VP for view of the object OB2 from the viewpoints around 360 degrees are set at equal intervals on the surface of the sphere SP. At the individual viewpoints VP, further, a plurality of states by in-plane rotation of the object OB2 may be set. Note that it is preferable to set the distance between the viewpoints VP and the object OB2 closer to the distance between the camera 400 to be actually used and the object OB2. The shape of the object OB2 when the object OB2 is seen from the individual viewpoints VP is referred to as "simulation model". The simulation model is created using the CAD data conversion-processed at step S120.

At step S130, a set of the unit normal vectors $n_f(i)$ of the microfacets MP (i) of the object in the simulation model is extracted as an attitude feature of the object. Further, some facets are not seen from the viewpoints VP due to irregularities of the surface of the object, and a probability of visibility to be described later is used as an attitude feature.

Figures 9, 10:
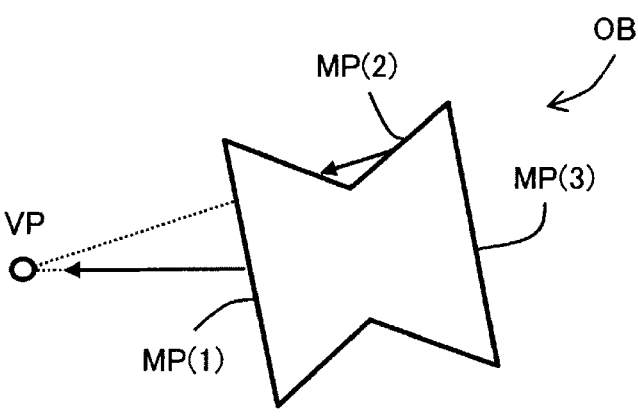
FIG. 9 is an explanatory diagram showing a calculation method of a probability of visibility of an object surface.
FIG. 10 is an explanatory diagram showing an example of a window for threshold adjustment of similar attitudes.

FIG. 9 is an explanatory diagram showing a calculation method of a probability of visibility of an object surface. The microfacet MP (1) of the object OB is visible without occlusion (hidden portion), the microfacet MP (2) is invisible with occlusion, and the microfacet MP (3) is invisible as a facet on the opposite side. The occlusion (hidden portion) is determined according to whether an obstacle exists between the center of the microfacet MP and the viewpoint VP. A probability of visibility $p_f$ of the object OB from a certain viewpoint VP is calculated in the following manner.

[Math. 1]

$$p_f = \Sigma_i n_f \cdot v_i, \text{ for } n_f v_i > 0 \text{ \& no occlusion} \qquad [1]$$

Here, $n_f$ is a unit normal vector of the microfacet MP (i), $v_i$ is a unit vector from the center of the microfacet MP (i) toward the viewpoint VP, and i is an ordinal number of the microfacet MP forming an object.

The probability of visibility $p_f$ is a value obtained by addition of inner products of the unit normal vector $n_f$ the microfacet MP (i) seen from the viewpoint VP and the unit vector $v_i$ from the center of the microfacet MP (i) toward the viewpoint VP with respect to the plurality of microfacets MP (i) forming the object. Note that a value obtained by division of $p_f$ calculated using the above described expression [1] by the number of microfacets MP (i) forming one object may be used as "probability of visibility".

The feature extraction unit 311 further calculates a flag $f_f$ indicating whether the attitude feature is visible, a ratio $r_f$, and a weight $w_f$ in the following manner.

[Math. 2]

$$f_f = \begin{cases} n_f \cdot v_i, & \text{if } n_f \cdot v_i > 0 \text{ and not occluded} \\ 0, & \text{else} \end{cases} \qquad [2]$$

$$r_f = \begin{cases} \vec{n}_f \cdot \vec{v}, & \text{if } f_f > 0 \\ 0, & \text{else} \end{cases} \qquad [3]$$

$$w_f = p_f \cdot r_f \cdot s_f. \qquad [4]$$

Here, $s_f$ is an area of the microfacet MP (i).

These parameters are used for extraction of the similar attitudes and extraction of the shape distinctive features. Generally, when the object is seen from the viewpoint without occlusion, the probability of visibility $p_f$ is the maximum and the weight $w_f$ takes a larger value. When occlusion occurs, the weight $w_f$ of the microfacet is zero.

At step S140 in FIG. 4, the feature extraction unit 311 extracts a plurality of similar attitudes. Specifically, similarities among attitudes seen from a certain viewpoint and attitudes seen from other viewpoints are calculated and the attitudes with the similarities equal to or larger than a threshold are extracted as similar attitudes using the above described attitude features. In this regard, alignment of simulation models seen from two viewpoints is performed using the ICP (Iterative closest point) method as a method of aligning point clouds, and then, the similarities of the attitudes are calculated. For example, a similarity $S_{im}$ of two attitudes is calculated using the following expression.

[Math. 3]

$$S_{im} = \Sigma_i [w_f e^{-d^2/\sigma^2} \cdot (n_p \cdot n_q)] / \Sigma_i w_f \qquad [5]$$

Here, i is an ordinal number of the microfacet MP forming the object, $w_f$ is the weight of the microfacet MP given by the expression [4], p, q are parameters for distinction of two attitudes for comparison i.e., a reference attitude and an attitude to be compared. $n_p$, $n_q$ are unit normal vectors of the microfacets MPp, MPq, d is a Euclidean distance between the microfacets, and $\sigma$ is a standard deviation of the depths measured by the camera 400. The term of $\exp(-d^2/\sigma^2)$ shows a weight depending on the distance. Here, in consideration of variations in depth value obtained by the real camera 400, the weight is set to be gradually lower as the distance is larger. The standard deviation σ may be determined by actual measurements of the depths obtained by the camera 400. Note that the standard deviation σ may be substituted with a fixed value. Further, the term of $\exp(-d^2/\sigma^2)$ takes a constant value independent of the attitude and may be omitted. The unit normal vectors $n_p$, $n_q$ of the microfacets MPp, MPq are extracted as the attitude features at step S130.

The similarity $S_{im}$ corresponds to a value obtained by weighted averaging of the inner products $n_p$, $n_q$ of the normal vectors of corresponding microfacets MPp, MPq of the reference attitude p and the other attitude q using the weight $w_f$ in consideration of the probability of visibility $p_f$. "Corresponding microfacets" are microfacets closest when the two attitudes are superimposed. The attitudes having similarities $S_{im}$ equal to or larger than the threshold are extracted as similar attitudes. The threshold may be adjusted by the user at step S150 in FIG. 4.

FIG. 10 is an explanatory diagram showing an example of a window for threshold adjustment of similar attitudes. This window W1 has a setting field SF for setting a threshold Th, in which the plurality of attitudes OB1_2 to OB1_4 of the same object OB1 and the similarities thereof are displayed. The similarities show degrees at which, with the first attitude OB1_1 as a reference attitude, the other attitudes OB1_2 to OB1_4 are similar to the reference attitude OB1_1 and values calculated by the expression [5]. The user may adjust the threshold Th for extraction of the similar attitudes using the window W1. In the example of FIG. 10, the threshold Th is set to 0.75 and, as a result, the two attitudes OB1_2, OB1_3 are similar to the reference attitude OB1_1 and the other attitude OB1_4 is not similar to the reference attitude OB1_1. That is, the three attitudes OB1_1 to OB1_3 are similar attitudes.

Figure 11:
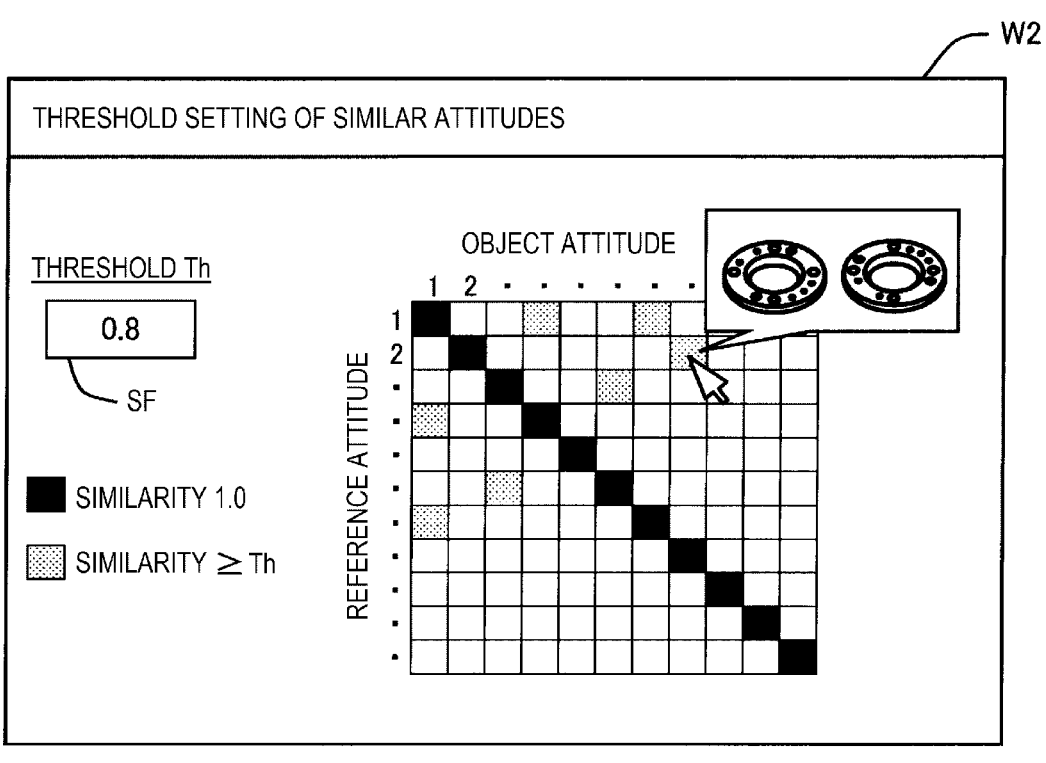
FIG. 11 is an explanatory diagram showing another example of the window for threshold adjustment of similar attitudes.

FIG. 11 is an explanatory diagram showing another example of the window for threshold adjustment of similar attitudes. The window W2 displays a grid showing a plurality of attitudes in addition to the setting field SF for setting the threshold Th. The vertical axis of the grid shows numbers indicating the reference attitude and the horizontal axis shows numbers indicating the object attitude. Of the individual grid positions, the positions of the similar attitudes are colored in different colors. Note that the grid positions on the diagonal lines indicate the same attitudes. When the user changes the threshold Th, colors of the grid positions change and the similar attitudes may be checked. Further, when the user designates an arbitrary grid position, a figure showing the attitude of the grid position and the similar attitudes thereof may be pop-up displayed.

At step S160 in FIG. 4, the feature extraction unit 311 extracts the shape distinctive features DF for distinction of the non-rotation-type similar attitudes. In the processing, first, superimposition processing is performed on the plurality of similar attitudes using the ICP (Iterative closest point) method like step S140 and distinctiveness Dis is calculated with respect to the individual microfacets MP.

[Math. 4]

$$D_{is}=\Sigma_j[r_f(1-e^{-d^2/\sigma^2})] \tag{6}$$

Here, j is an ordinal number of the similar attitude, $r_f$ is the ratio given by the expression [3], and d, σ are the Euclidean distance and the standard deviation used in the expression [5].

The distinctiveness Dis is higher when the microfacet is not in the other similar attitudes. When the distinctiveness Dis is equal to or larger than a predetermined distinctiveness threshold, the unit normal vector of the microfacet is registered in the memory 320 as the shape discrimination feature DF for distinction of the similar attitudes. For example, in the case of the first object OB1 shown in FIG. 5, a set of unit normal vectors of a plurality of microfacets forming a projecting portion projecting from the surface is the shape discrimination feature DF. Further, in the shape discrimination features DF, attitude data containing the point clouds representing the plurality of similar attitudes is registered. The shape discrimination features DF show features on shapes of characteristic portions of the object imaged by the camera 400 in the respective plurality of similar attitudes.

At step S170 in FIG. 4, the feature extraction unit 311 extracts rotation distinctive features MF for distinction of the rotation-type similar attitudes.

Figure 12:
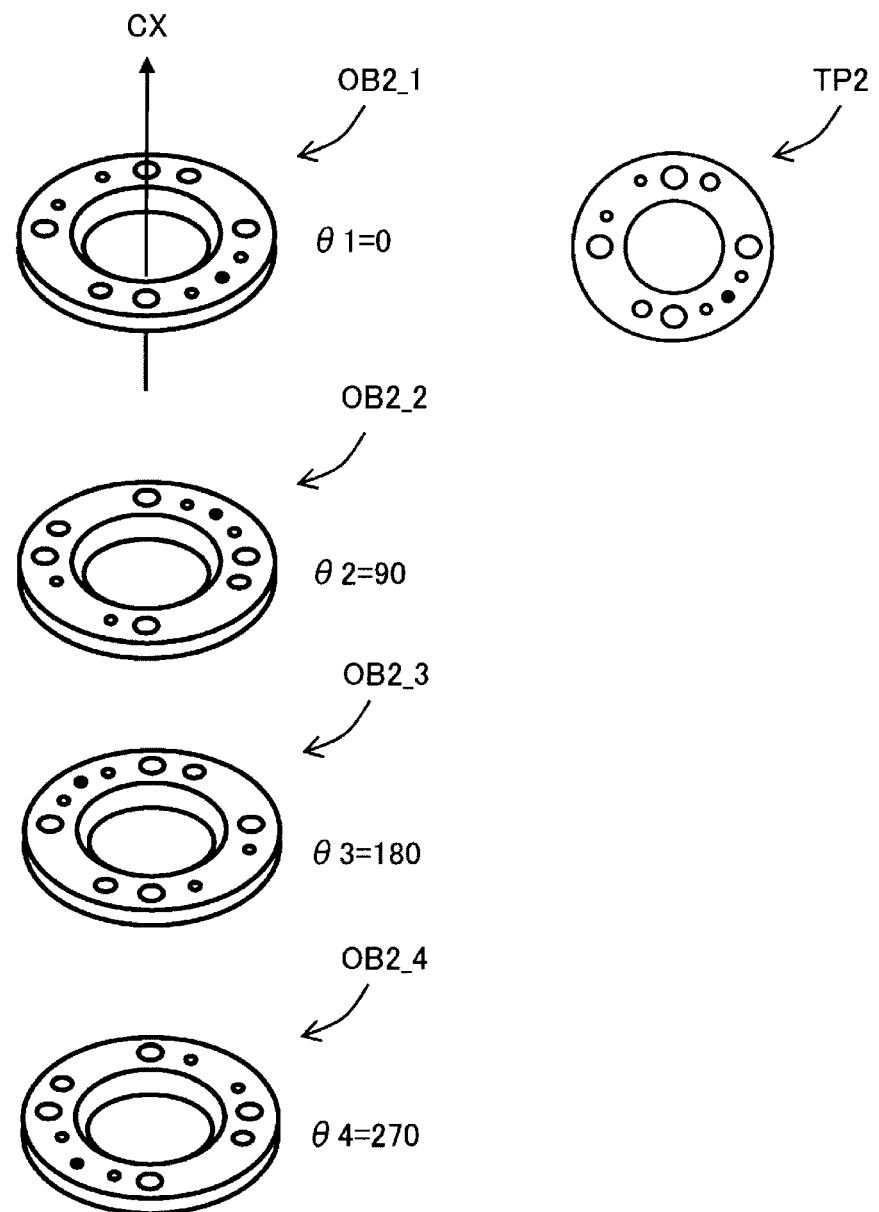
FIG. 12 is an explanatory diagram showing a rotation axis as a rotation distinctive feature and a template.

FIG. 12 is an explanatory diagram showing the rotation axis CX extracted as the rotation distinctive feature MF and a template TP2. In the extraction processing of the rotation distinctive features MF, first, the rotation axis CX of the object OB2 is obtained and, further, rotation angles θ2 to θ4 of the plurality of similar attitudes OB2_2 to OB2_4 are obtained with reference to the reference attitude OB2_1. A rotation angle θ1 of the reference attitude OB2_1 is zero. In the extraction processing of the rotation distinctive features MF, further, the template TP2 showing the object OB projected on the projection surface orthogonal to the rotation axis CX is created using the CAD data of the object OB2. The rotation distinctive features RF are configured to include the rotation axis CX, the rotation angles 81 to 84, and the template TP2 and registered in the memory 320. Further, the attitude data containing the point clouds representing the plurality of similar attitudes is also registered in the rotation distinctive features RF.

The feature extraction processing is finished in the above described manner, and then, work by the robot 100 is started. That is, the object image IM of the object is captured by the camera 400 and the position and attitude recognition unit 312 recognizes the position and the attitude of the object using the object image IM, and the robot 100 executes picking work using the recognized position and attitude of the object.

Figure 13:
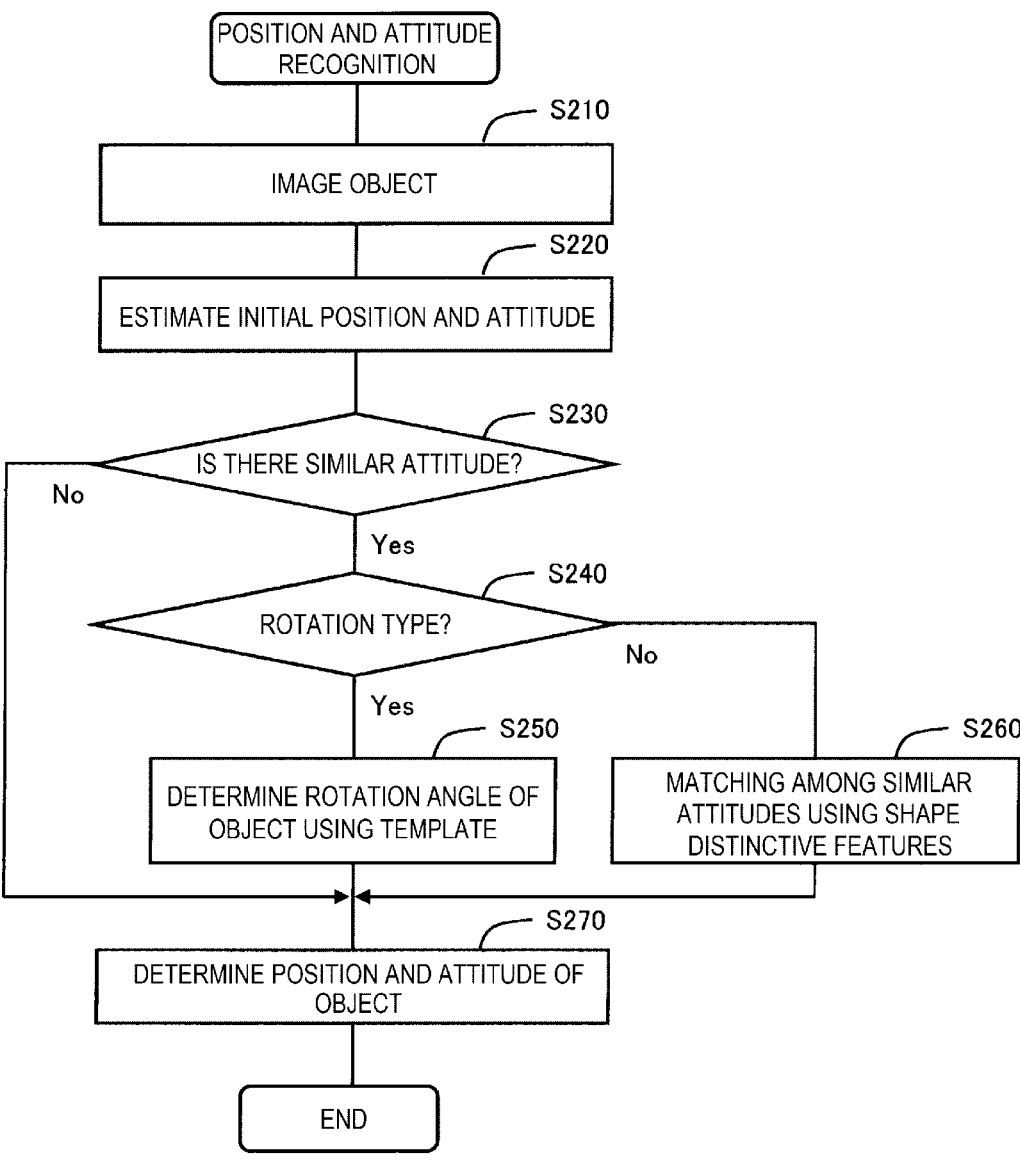
FIG. 13 is a flowchart showing a procedure of position and attitude recognition processing.

FIG. 13 is a flowchart showing a procedure of position and attitude recognition processing executed by the position and attitude recognition unit 312. At step S210, the object image IM of the object OB is captured using the camera 400. At step S220, the initial attitude estimation section 314 estimates the initial position and attitude of the object OB from the object image IM obtained by the camera 400. The estimation processing is performed using e.g., template matching. That is, the attitude of the object OB appearing in the object image IM is simulated based on the CAD data of the object OB and the real camera position, and templates are created with respect to each attitude of the object OB in advance. Then, template matching is performed using the object image IM actually captured by the camera 400, and thereby, the object OB within the object image IM is detected and the position and attitude thereof are estimated.

Note that the estimation processing of the position and attitude is not limited to the above described template matching, but may be executed using another method. For example, the estimation processing of the position and attitude may be executed using a machine learning model such as a convolutional neural network.

The position and attitude of the object obtained in the estimation processing at step S220 are referred to as "initial position" and "initial attitude". An error in initial position is not so large, but it is highly likely that the initial attitude is false for the object having similar attitudes as shown in FIGS. 5 and 6. Accordingly, at step S230 and the subsequent steps, the similar attitude processing section 316 executes processing of selecting one of the plurality of similar attitudes corresponding to the correct attitude of the object OB.

At step S230, the similar attitude processing section 316 determines whether there is a similar attitude to the initial attitude. Whether there is a similar attitude may be determined with reference to the shape distinctive features DF and the rotation distinctive features RF created in the above described processing in FIG. 4. For example, when a degree of coincidence between the point cloud representing the outer shape of the object OB in the initial attitude and the point cloud of the similar attitude contained in the shape distinctive features DF is equal to or larger than a predetermined threshold, a determination that there is a similar attitude may be made. The same applies to the rotation distinctive features RF. When there is no similar attitude, the process goes to step S270 and the initial position and attitude are determined as the final position and attitude without change and the processing is ended.

When there is a similar attitude, the process goes to step S240 and whether the similar attitude is of a rotation-type is determined. When the similar attitude is of a rotation-type, the process goes to step S250 and the similar attitude processing section 316 determines a rotation angle between the template contained in the rotation distinctive features RF and the object in the object image IM. For example, this processing can be performed by executing first processing of respectively performing Fourier transformation and transformation into polar coordinates on the two-dimensional image M1 of the object image IM and the template TP2 shown in FIG. 12 and respectively obtaining feature spectra at the polar coordinates and second processing of determining a rotation angle using an angular difference in polar coordinates between a peak position of the feature spectrum and a peak position of the feature spectrum on the template TP2. Before the first processing, preprocessing such as edge extraction and denoising may be performed. The similar attitude processing section 316 selects one of the plurality of similar attitudes OB2_1 to OB2_4 as a correct attitude using thus determined rotation angle.

When the similar attitude is of a non-rotation type, the process goes to step S260 and the similar attitude processing section 316 selects one of the plurality of similar attitudes by performing matching of the similar attitudes using the shape distinctive features DF. In the processing, first, the point cloud representing the outer shape of the object is extracted from the object image as object feature information representing the estimated initial attitude. Then, matching is performed between the point cloud and the shape distinctive features DF of the similar attitudes and the similar attitude having the highest degree of coincidence is selected as the correct attitude.

At step S270, the similar attitude processing section 316 determines and outputs the position estimated at step S220 and the attitude determined at one of steps S230, S250, S260 as the position and attitude of the object. The robot control program RP executes picking work of the object using the position and attitude.

According to the above described embodiment, when the initial attitude estimated from the object image IM of the object OB corresponds to one of the plurality of similar attitudes, the one of the plurality of similar attitudes is determined as the attitude of the object OB using the distinctive features DF, RF created in advance, and thereby, differences among the plurality of similar attitudes can be distinguished using the distinctive features DF, RF.

Note that, in the above described embodiment, the two kinds of distinctive features of the shape distinctive features DF and the rotation distinctive features RF are used as the distinctive features for distinction of the similar attitudes, however, only one kind of the distinctive features may be used. Alternatively, the plurality of similar attitudes may be distinguished using distinctive features having other configurations than the distinctive features DF, RF.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) According to a first aspect of the present disclosure, a method of recognizing a position and an attitude of an object imaged by a camera is provided. The method includes (a) extracting distinctive features used for respectively distinguishing a plurality of similar attitudes from which images similar to one another are obtained using a simulation model of the object, (b) capturing an object image of the object using the camera, (c) estimating the position and the attitude of the object using the object image, and (d) when the estimated attitude corresponds to one of the plurality of similar attitudes, determining the one of the plurality of similar attitudes as the attitude of the object using the distinctive features.

According to the method, the differences among the plurality of similar attitudes may be distinguished using the distinctive features with respect to the object that may take the plurality of similar attitudes.

(2) In the above described method, the distinctive features may be shape distinctive features on shapes of characteristic portions of the object imaged by the camera in the respective plurality of similar attitudes, and the step (d) may include extracting object feature information corresponding to the shape distinctive features from the object image, and determining one having the shape distinctive feature closest to the object feature information of the plurality of similar attitudes as the attitude of the object.

According to the method, the differences among the plurality of similar attitudes may be distinguished using the shape distinctive features on the shapes of the characteristic portions of the object.

(3) In the above described method, the plurality of similar attitudes may be attitudes formed by rotation of the object around one rotation axis, the distinctive features may include a template showing the object projected on a projection surface orthogonal to the rotation axis, and the step (d) may include (d1) obtaining a rotation angle between the template and the object in the object image, and (d2) selecting one of the plurality of similar attitudes using the rotation angle.

According to the method, the differences among the plurality of similar attitudes may be distinguished using the template with respect to the object having the rotation axis.

(4) In the above described method, the step (d2) may include respectively performing Fourier transformation and transformation into polar coordinates on the object image and the template and respectively obtaining feature spectra at the polar coordinates, and determining the rotation angle using an angular difference in polar coordinates between a peak position of the feature spectrum and a peak position of the feature spectrum on the template.

According to the method, the rotation angle between the object in the object image and the template may be obtained using Fourier transformation.

(5) According to a second aspect of the present disclosure, a system of recognizing a position and an attitude of an object imaged by a camera is provided. The system includes a feature extraction unit extracting distinctive features used for respectively distinguishing a plurality of similar attitudes from which images similar to one another are obtained using a simulation model of the object, and a recognition unit recognizing the position and the attitude of the object using an object image of the object captured by the camera. The recognition unit executes (a) processing of estimating the position and the attitude of the object using the object image, and (b) when the estimated attitude corresponds to one of the plurality of similar attitudes, processing of determining the one of the plurality of similar attitudes as the attitude of the object using the distinctive features.

(6) According to a third aspect of the present disclosure, a computer program for controlling a processor to execute processing of recognizing a position and an attitude of an object imaged by a camera is provided. The computer program is for controlling the processor to execute (a) processing of extracting distinctive features used for respectively distinguishing a plurality of similar attitudes from which images similar to one another are obtained using a simulation model of the object, (b) processing of capturing an object image of the object using the camera, (c) processing of estimating the position and the attitude of the object using the object image, and (d) when the estimated attitude corresponds to one of the plurality of similar attitudes, processing of determining the one of the plurality of similar attitudes as the attitude of the object using the distinctive features.

The present disclosure can be realized in various other aspects than those described as above. For example, the present disclosure can be realized in aspects of a robot system including a robot and a robot control apparatus, a computer program for realizing functions of the robot control apparatus, a non-transitory storage medium storing the computer program, etc.

What is claimed is:

1. A method of recognizing a position and an attitude of an object imaged by a camera, comprising:
   (a) extracting distinctive features used for respectively distinguishing a plurality of similar attitudes from which images similar to one another are obtained using a simulation model of the object, the extracting of the distinctive features including:
      placing the simulation model at a center of a virtual sphere;
      setting a plurality of viewpoints for viewing the simulation model at equal intervals along 360 degrees on an outer surface of the virtual sphere;
      calculating a similarity of every two attitudes of a plurality of attitudes of the simulation model between viewing from one viewpoint of the plurality of viewpoints and viewing from another viewpoint of the plurality of viewpoints for every viewpoint of the plurality of viewpoints;
      extracting the plurality of similar attitudes, each of the plurality of similar attitudes having the similarity that is equal to or more than a threshold value; and
      extracting the distinctive features based on shapes and rotations of the plurality of similar attitudes;
   (b) capturing an object image of the object using the camera;
   (c) estimating the position and the attitude of the object using the object image; and
   (d) when the estimated attitude corresponds to first attitude of the plurality of similar attitudes, determining the first attitude of the plurality of similar attitudes as the attitude of the object using the distinctive features.

2. The method according to claim 1, wherein the distinctive features are shape distinctive features on shapes of characteristic portions of the object imaged by the camera in the respective plurality of similar attitudes, and
   the step (d) includes
   extracting object feature information corresponding to the shape distinctive features from the object image, and
   determining the first attitude having the shape distinctive feature of the plurality of similar attitudes closest to the object feature information as the attitude of the object.

3. The method according to claim 1, wherein the plurality of similar attitudes are attitudes formed by rotation of the object around one rotation axis,
   the distinctive features include a template showing the object projected on a projection surface orthogonal to the rotation axis, and
   the step (d) includes
   (d1) obtaining a rotation angle between the template and the object in the object image, and
   (d2) selecting one of the plurality of similar attitudes using the rotation angle.

4. The method according to claim 3, wherein the step (d2) includes
   respectively performing Fourier transformation and transformation into polar coordinates on the object image and the template and obtaining a first feature spectrum of the object image and a second feature spectrum of the template at the polar coordinates, and
   determining the rotation angle using an angular difference in polar coordinates between a peak position of the first feature spectrum and a peak position of the second feature spectrum.

5. The method according to claim 1, further comprising:
   (e) causing a robot to perform an operation with respect to the object based on the estimated position of the object and one of the estimated attitude of the object and the first attitude of the plurality of similar attitudes.

6. A system of recognizing a position and an attitude of an object, comprising:
   a camera configured to capture an object image of the object;
   a memory configured to store a program; and
   a processor configured to execute the program so as to:
      extract distinctive features used for respectively distinguishing a plurality of similar attitudes from which images similar to one another are obtained using a simulation model of the object, the extracting of the distinctive features including:

placing the simulation model at a center of a virtual sphere;

setting a plurality of viewpoints for viewing the simulation model at equal intervals along 360 degrees on an outer surface of the virtual sphere;

calculating a similarity of every two attitudes of a plurality of attitudes of the simulation model between viewing from one viewpoint of the plurality of viewpoints and viewing from another viewpoint of the plurality of viewpoints for every viewpoint of the plurality of viewpoints;

extracting the plurality of similar attitudes, each of the plurality of similar attitudes having the similarity that is equal to or more than a threshold value; and extracting the distinctive features based on shapes and rotations of the plurality of similar attitudes;

(b) causing the camera to capture the object image of the object;

(c) estimating the position and the attitude of the object using the object image; and (d) when the estimated attitude corresponds to first attitude of the plurality of similar attitudes, processing of determining the first attitude of the plurality of similar attitudes as the attitude of the object using the distinctive features.

7. The system according to claim 6, wherein the processor is further configured to perform:

(e) causing a robot to perform an operation with respect to the object based on the estimated position of the object and one of the estimated attitude of the object and the first attitude of the plurality of similar attitudes.

8. A computer program product embodying computer readable instructions stored on a non-transitory computer-readable medium for controlling a processor to execute processing of recognizing a position and an attitude of an object imaged by a camera, the processor is configured to perform the steps of:

(a) processing of extracting distinctive features used for respectively distinguishing a plurality of similar attitudes from which images similar to one another are obtained using a simulation model of the object, the extracting of the distinctive features including:

placing the simulation model at a center of a virtual sphere;

setting a plurality of viewpoints for viewing the simulation model at equal intervals along 360 degrees on an outer surface of the virtual sphere;

calculating a similarity of every two attitudes of a plurality of attitudes of the simulation model between viewing from one viewpoint of the plurality of viewpoints and viewing from another viewpoint of the plurality of viewpoints for every viewpoint of the plurality of viewpoints;

extracting the plurality of similar attitudes, each of the plurality of similar attitudes having the similarity that is equal to or more than a threshold value; and extracting the distinctive features based on shapes and rotations of the plurality of similar attitudes;

(b) processing of causing the camera to capture an object image of the object;

(c) processing of estimating the position and the attitude of the object using the object image; and (d) when the estimated attitude corresponds to first attitude of the plurality of similar attitudes, processing of determining the first attitude of the plurality of similar attitudes as the attitude of the object using the distinctive features.

9. The computer program product according to claim 8, wherein the processor is further configured to perform:

(e) processing of causing a robot to perform an operation with respect to the object based on the estimated position of the object and one of the estimated attitude of the object and the first attitude of the plurality of similar attitudes.

* * * * *